United States Patent
Ohnishi (10) Patent No.: US 10,297,005 B2
(45) Date of Patent: May 21, 2019

(54) METHOD FOR GENERATING PANORAMIC IMAGE

(75) Inventor: Motoo Ohnishi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 595 days.

(21) Appl. No.: 13/224,841

(22) Filed: Sep. 2, 2011

(65) Prior Publication Data

US 2012/0056977 A1    Mar. 8, 2012

(30) Foreign Application Priority Data

Sep. 6, 2010  (JP) .................................. 2010-198776

(51) Int. Cl.
*G06T 3/00*  (2006.01)

(52) U.S. Cl.
CPC .................. *G06T 3/0043* (2013.01)

(58) Field of Classification Search
CPC .. H04N 5/23238; H04N 5/232; H04N 5/2628; H04N 1/3876; G06T 7/0024; G06T 3/0062; G06T 5/006; G03B 37/00; G03B 37/04; G03B 37/02
USPC ..................................................... 348/36–39
See application file for complete search history.

(56) References Cited

U.S. PATENT DOCUMENTS

| 6,769,131 | B1 | 7/2004 | Tanaka |
| 6,930,703 | B1* | 8/2005 | Hubel et al. .................... 348/37 |
| 2003/0137589 | A1 | 7/2003 | Miyata |
| 2006/0139484 | A1* | 6/2006 | Seo et al. ....................... 348/373 |
| 2006/0192853 | A1 | 8/2006 | Lee |
| 2008/0088699 | A1 | 4/2008 | Fujita |
| 2010/0123737 | A1* | 5/2010 | Williamson et al. .......... 345/672 |
| 2013/0021433 | A1* | 1/2013 | Belsarkar ............... H04N 7/181 348/36 |

FOREIGN PATENT DOCUMENTS

| CN | 1694512 | A  | 11/2005 |
| CN | 1784004 | A  | 6/2006 |
| EP | 1016031 | A1 | 7/2000 |
| EP | 1016031 | B1 | 8/2007 |
| JP | 2001-069494 | A | 3/2001 |
| JP | 2001-136514 | A | 5/2001 |

\* cited by examiner

*Primary Examiner* — Farhan Mahmud
(74) *Attorney, Agent, or Firm* — Canon USA, Inc., IP Division (57) ABSTRACT

A processing apparatus capable of generating a panoramic image from a plurality of captured images acquired by a plurality of times of imaging includes an input unit configured to input a superimposition parameter for determining a superimposition position of a predetermined image on the captured image, a generation unit configured to generate the panoramic image from the plurality of the captured images by transformation processing of coordinate values of the plurality of the captured images acquired by the plurality of times of imaging, and a determination unit configured to determine the superimposition position of the predetermined image on the panoramic image according to position information on the panoramic image in which transformation processing of the coordinate values is performed by the generation unit and the superimposition parameter for determining the superimposition position of the predetermined image on the captured image.

11 Claims, 5 Drawing Sheets

METHOD FOR GENERATING PANORAMIC IMAGE

BACKGROUND OF THE INVENTION

Field of the Invention

The present invention relates to a panoramic image generation method for generating a panoramic image from a plurality of captured images.

Description of the Related Art

As a panoramic image generation method, Japanese Patent Application Laid-Open No. 2001-136514 discusses a technique for dividing an entire area that imaging apparatus can photograph by oscillation into a plurality of areas, performing projective transformation of captured images of each area, and connecting them.

As a synthesis method of a privacy mask, Japanese Patent Application Laid-Open No. 2001-69494 discusses a technique for generating a privacy mask having a position and a size according to an oscillation angle of the imaging apparatus, and superimposing the mask to a captured image.

However, there is a possibility that the quality of the panoramic image may be deteriorated depending on a position on which the captured image is processed.

For example, in a case that a privacy mask area is overlapped between a plurality of captured images for generating a panoramic image, there is a possibility that a privacy mask image is shifted at a connected part when a panoramic image is generated by performing projective transformation on the plurality of captured images on which the privacy mask image is superimposed.

Further, for example, in a case that a privacy mask area (hereinafter referred to as the mask area) is not overlapped between a plurality of captured images, there is a possibility that an area on a panoramic image, which should be a mask area, does not become the mask area. For example, a case is described in which a position of a mask area is managed by information of a pan angle and a tilt angle of a camera corresponding to a center position of the mask area, and a size of the mask area is managed by information about a width and a height.

In this case, if a mask image is superimposed on each of the plurality of captured images based on the pan angles and the tile angles at the time of capturing the plurality of images; and then an panoramic image is generated, there is a possibility that an area which should be a mask area is shifted from an area on which the mask image is actually superimposed. This phenomenon is particularly remarkable at an area having a large tilt angle (in general, an upper area of a panoramic image). This is because as the tilt angle is large, a moving direction of an image capturing direction of the camera according to pan control becomes different from a just horizontal direction.

In addition, when an imaging apparatus including an on-screen display function generates a panoramic image, there is a possibility that an image quality of the panoramic image is deteriorated. The on-screen display function superimposes an on-screen image, such as an imaging date/time and an imaging place, on a captured image. More specifically, there is a possibility that an unnecessary on-screen image is superimposed at a connected part of the captured images on the panoramic image depending on a superimposition position of the on-screen image.

Figure 5:
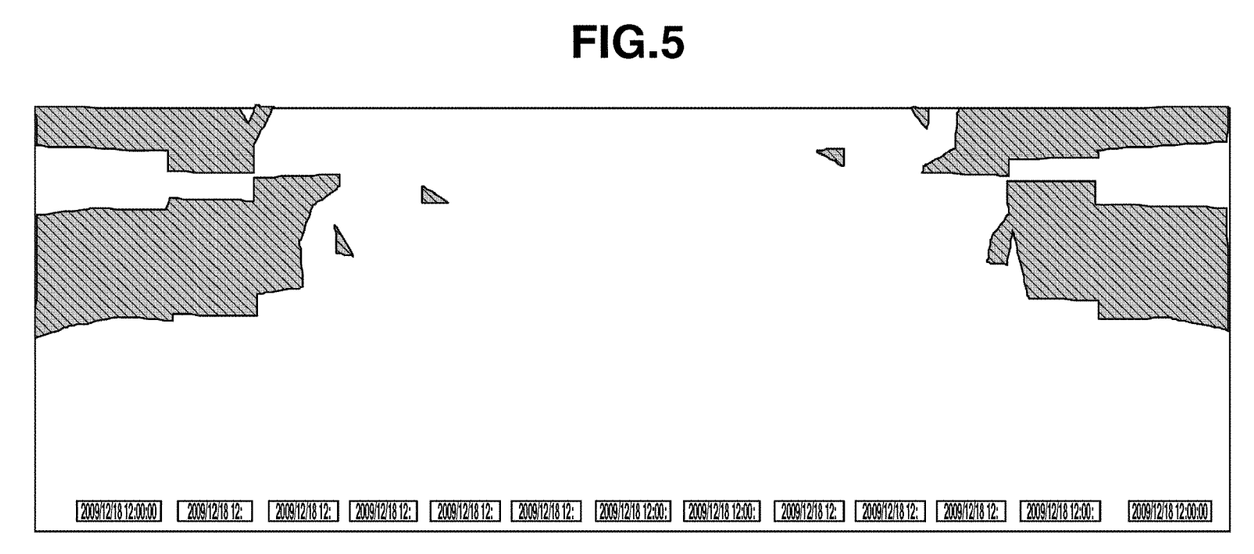
FIG. 5 illustrates an example of a panoramic image generated by a conventional method.

FIG. 5 illustrates an example of a panoramic image generated by the above-described method. In FIG. 5, shadow areas illustrate a privacy mask image and areas indicating a date/time on the below side illustrate on-screen images. As illustrated in FIG. 5, depending on the superimposition position of the privacy mask image on each captured image, there is a possibility that an irregular area and a partially missed area generate at an edge part of the privacy mask image. Further, depending on the superimposition position of the on-screen image on each captured image, there is a possibility that a not-distinguishable unnecessary on-screen image is superimposed.

SUMMARY OF THE INVENTION

The present invention relates to a method for improving a quality of a panoramic image generated from a plurality of captured images.

According to an aspect of the present invention, a processing apparatus capable of generating a panoramic image from a plurality of captured images acquired by a plurality of times of imaging includes an input unit configured to input a superimposition parameter for determining a superimposition position of a predetermined image on the captured image, a generation unit configured to generate the panoramic image from the plurality of the captured images by transformation processing of coordinate values of the plurality of the captured images acquired by the plurality of times of imaging, and a determination unit configured to determine the superimposition position of the predetermined image on the panoramic image according to position information on the panoramic image in which transformation processing of the coordinate values is performed by the generation unit and the superimposition parameter for determining the superimposition position of the predetermined image on the captured image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
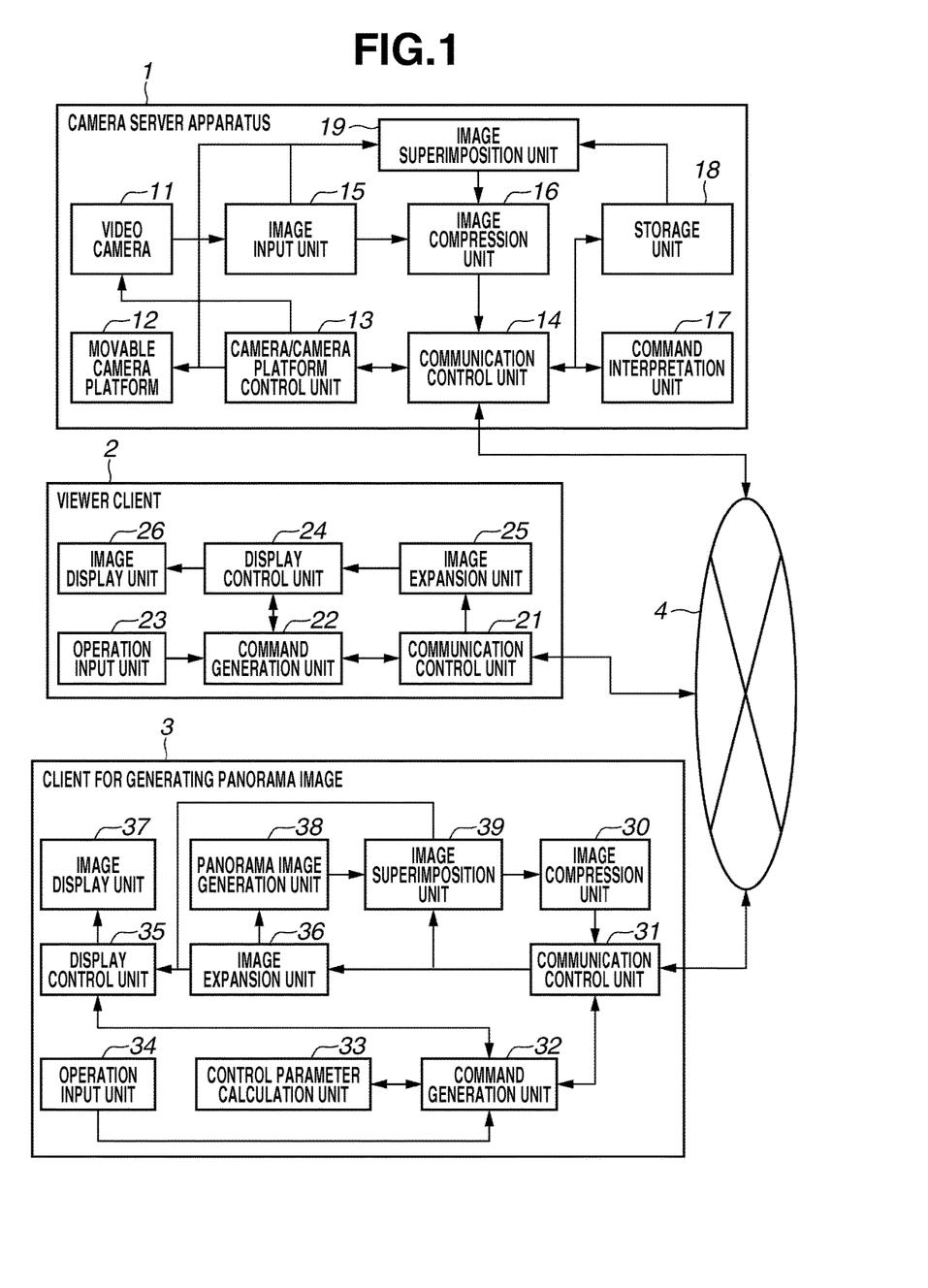
FIG. 1 is a block diagram illustrating a network camera system for generating a panoramic image.

FIG. 1 is a block diagram illustrating a network camera system according to an exemplary embodiment of the present invention.

In the present exemplary embodiment, a camera server 1, a viewer client 2 (hereinafter referred to as a client 2), and a client for generating a panoramic image 3 (hereinafter referred to as a client 3) are connected via a network 4. A plurality of the camera servers 1, the clients 2, and the clients 3 can be connected to the network 4. In the present exemplary embodiment, the client 3 is a processing apparatus for generating a panoramic image from a plurality of captured images acquired by a plurality of times of imaging. The panoramic image in the present exemplary embodiment is an image having a wider field angle than a captured image acquired by imaging of one time.

The network 4 is a digital network, such as internet and intranet, which can communicate a camera control signal and a captured image by the camera server 1. In the present exemplary embodiment, a transmission control protocol/internet protocol (TCP/IP) protocol (or user datagram protocol/internet protocol (UDP/IP)) is assumed as a network protocol. Further, in the present exemplary embodiment, a different internet protocol (IP) address is assigned to each of the camera server 1, the client 2, and the client 3.

The camera server 1 transmits a captured image via the network 4 in response to an image request command from the clients 2 and 3. Further, the camera server 1 executes various types of camera control (for example, pan/tilt/zoom control) in response to a camera control command from the clients 2 and 3. An image input unit 15 in the camera server 1 acquires an image (a moving image and a still image) captured by a video camera 11. The image input unit 15 inputs the captured image to an image superimposition unit 19 when a privacy mask and an on-screen display are effective. The image input unit 15 inputs the captured image to an image compression unit 16 when the privacy mask and the on-screen display are not effective.

The image superimposition unit 19 superimposes a privacy mask image and an on-screen image on the input captured image and inputs the superimposed captured image to the image compression unit 16. In other words, the superimposition unit 19 in the camera server 1 superimposes the on-screen image and the privacy mask image on the captured image.

The on-screen image is, for example, an imaging date, an imaging time, or an imaging place of a captured image, a text image and a picture image regarding an imaging object, or identification information of the camera server 1. The privacy mask image is, for example, a mask image for making a person, a name, or a numeral impossible to be specified. The privacy mask can be, for example, an image painted out with one color or a mosaic image.

Operation input units 23 and 34 of the clients 2 and 3 of the present exemplary embodiment can input a superimposition position of the privacy mask image. Communication control units 21 and 31 of the clients 2 and 3 transmit a command including a superimposition parameter indicating the superimposition position to the camera server 1, according to input of the superimposition position by the operation input units 23 and 34.

The image superimposition unit 19 in the camera server 1 superimposes the privacy mask image on an area on the captured image according to the superimposition parameter notified from the clients 2 and 3, pan/tilt/zoom values of the video camera 11 at the time of inputting the superimposition position, and current pan/tilt/zoom values of the video camera 11. When a panoramic image is generated from a plurality of captured images, the privacy mask image is also superimposed on the panoramic image according to an input of the superimposition position on the captured image.

However, the superimposition position of the privacy mask is not limited in an example determined by input of the superimposition area by a user. For example, the superimposition position can be determined so as to be superimposed on a face area detected by image processing.

The image compression unit 16 compresses the captured image input from the image input unit 15 or the image superimposition unit 19 to a data size which is easily transmitted to a client, and inputs the compressed captured image to a communication control unit 14. The communication control unit 14 transmits the captured image compressed by the image compression unit 16 to a transmission source client of the image request command via the network 4.

A storage unit 18 stores setting values of the privacy mask and on-screen display, various setting values and data of the panoramic image generated by the client 3. A command interpretation unit 17 interprets the command from the clients 2 and 3, and controls each part of the camera server 1. For example, the command interpretation unit 17 controls a direction of a movable camera platform 12 and a zoom magnification of the video camera 11 via a camera/camera platform control unit 13, in response to receiving a camera control command by the communication control unit 14.

The image compression unit 16 of the present exemplary embodiment performs analog/digital (A/D) conversion of a national television system committee (NTSC) image signal from the video camera 11, and then, compresses it by Motion-Joint Photographic Experts Group (MotionJEPG). However, another compression method can be used. Further, the command interpretation unit 17 inputs the superimposition parameter to the storage unit 18 and the image superimposition unit 19, in response to receiving the command including the superimposition parameter indicating the superimposition position of the privacy mask image by the communication control unit 14.

The client 2 designates an IP address assigned to the camera server 1 and is connected to the camera server 1. The communication control unit 21 transmits the image request command and the camera control command to the camera server 1. Further, the communication control unit 21 receives, from the camera server 1, the captured image, the panoramic image, and various camera control results.

A display control unit 24 generates a graphical user interface (GUI) from the captured image and the panoramic image which are expanded by an image expansion unit 25 and various camera control results, and then, displays the GUI by a screen display unit 26. The operation input unit 23 receives a GUI operation by the user using a mouse or a keyboard.

The GUI operation of the user is, for example, an operation for instructing the video server 1 to perform the pan/tilt control and the zoom control. More specifically, the user performs the GUI operation, such as mouse click on the panoramic image displayed in the screen display unit 26 and drag of a frame displaying the pan/tilt/zoom values of the video camera 11. A command generation unit 22 generates various camera control commands according to the GUI operation received by the operation input unit 23. The generated camera control commands are transmitted from the communication control unit 21 to the camera server 1.

The client 3 designates, like the client 2, the IP address assigned to the camera server 1 and is connected to the camera server 1. The communication control unit 31, a display control unit 35, an image expansion unit 36, and a screen display unit 37 respectively have similar functions to those in the client 2.

The operation input unit 34 in the client 3 receives input of a GUI operation for requesting a panoramic image from the camera server 1 in addition to the operation input from the operation input unit 23 in the client 2. The GUI operation for requesting the panoramic image may include a GUI operation for designating an area of the panoramic image. A parameter calculation unit 33 in the client 3 calculates a pan/tilt angle for capturing an image for generating a panoramic image according to the GUI operation for requesting the panoramic image, which is input by the operation input unit 34, and inputs the calculated result to a command generation unit 32.

The command generation unit 32 generates a camera control command according to the input pan/tilt angle, and transmits the command to the camera server 1 via the communication control unit 31. The camera server 1 which receives the camera control command controls the movable camera platform 12 to have the pan/tilt angle according to the camera control command and then transmits a captured image by the video camera 11 to the client 3.

The operation input unit 34 in the client 3 can also input for designing the superimposition position of the privacy mask image on the captured image. When the superimposition position of the privacy mask image is input from the operation input unit 34, the communication control unit 31 transmits a command containing the superimposition parameter indicating the superimposition position to the camera server 1.

A panoramic image generation unit 38 generates a panoramic image from a plurality of captured images received from the camera server 1. More specifically, the panoramic image generation unit 38 converts coordinate values of the plurality of captured images, which are expanded in the image expansion unit 36, by transformation processing (projective transformation) and connects them, so that the panoramic image is generated. The panoramic image generated by the panoramic image generation unit 38 is input to an image superimposition unit 39.

The image superimposition unit 39 superimposes the privacy mask image on the panoramic image generated by the panorama generation unit 38 and outputs to an image compression unit 30. The image superimposition unit 39 in the client 3 determines the superimposition position of the privacy mask image on the panoramic image based on the superimposition parameter indicating the superimposition position specified on the captured image and a calculation formula of the projective transformation.

More specifically, the image superimposition unit 39 determines the superimposition position of the privacy mask image on a panoramic image so that a predetermined image (the privacy mask image) is superimposed at the superimposition position on the panoramic image, in which the superimposition position on the captured image is converted. The image superimposition unit 39 superimposes the privacy mask image at the determined superimposition position.

The image compression unit 30 compresses the panoramic image on which the privacy mask image is superimposed by the image superimposition unit 39 and transmits the panoramic image to the communication control unit 31. The panoramic image transmitted from the communication control unit 31 to the camera server 1 is stored in the storage unit 18 in the camera server 1 and transmitted according to a request from another client (the client 2).

Figure 2:
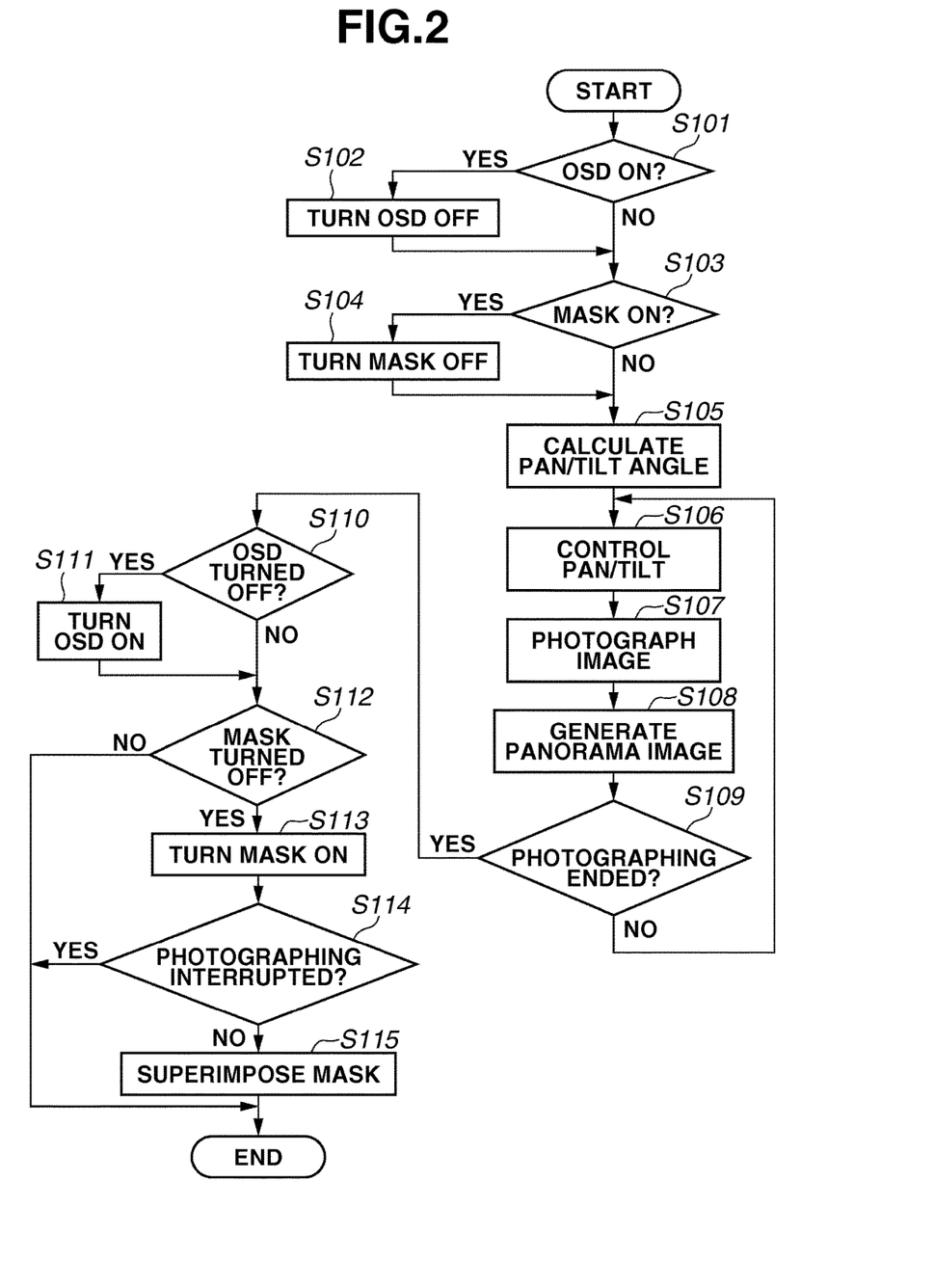
FIG. 2 is a flow chart illustrating processing for generating a panoramic image.

FIG. 2 is a flowchart illustrating generation processing of a panoramic image in the camera server 1 and the client 3 in the present exemplary embodiment. The client 3 is a processing apparatus which generates a panoramic image from a plurality of captured images acquired by a plurality of times of imaging. The processing in FIG. 2 is started in response to an input operation of an instruction to generate a panoramic image by the operation input unit 34 in the client 3.

In step S101, the command generation unit 32 in the client 3 determines whether an on-screen display (OSD) in the camera server 1 is effective (ON). When the command generation unit 32 determines that the on-screen display is ON (YES in step S101), in step S102, the command generation unit 32 transmits a control command for turning the on-screen display in the camera server 1 ineffective (OFF).

The communication control unit 14 in the camera server 1 turns a function of the on-screen display by the image superimposition unit 19 ineffective (OFF), according to receiving of the control command for turning the on-screen display ineffective.

In step S103, the command generation unit 32 determines whether privacy mask processing in the camera server 1 is effective (ON). When the command generation unit 32 determines that the privacy mask processing is ON (YES in step S103), in step S104, the command generation unit 32 transmits a control command for turning the privacy mask processing in the camera server 1 ineffective (OFF).

The communication control unit 14 in the camera server 1 turns the privacy mask processing by the image superimposition unit 19 ineffective (OFF), according to receiving of the control command for turning the privacy mask processing ineffective.

In step S105, the control parameter calculation unit 33 in the client 3 calculates a pan/tilt angle of each of the plurality of the captured images for generating a panoramic image based on information concerning a panoramic image area input from the operation input unit 34.

In step S106, the command generation unit 32 transmits the camera control command for controlling the video camera 11 to the image capturing direction according to one pan/tilt angle in a plurality of pan/tilt angles calculated in step S105.

When the communication control unit 31 receives a notification indicating that the image capturing direction of the video camera 11 is controlled in the image capturing direction according to the camera control command transmitted in step S106, then in step S107, the command generation unit 32 transmits an imaging command.

The video camera 11 captures images at a current pan/tilt angle in response to receiving of the imaging command by the communication control unit 14. With this processing, one image in the plurality of captured images for generating the panoramic image is acquired. The captured image acquired by the video camera 11 is compressed by the image compression unit 16 and transmitted to the client 3 via the communication control unit 14.

In step S108 (a generation procedure), the client 3 which receives the compressed captured image from the camera server 1 expands the captured image in the image expansion unit 36, connects the expanded image with the other captured images in the panoramic image generation unit 38 and generates the panoramic image.

More specifically, the panoramic image generation unit 38 in the client 3 generates the panoramic image from the plurality of captured images by transformation processing (projective transformation) of coordinate values of the plurality of captured images acquired by a plurality of times of imaging. The detail of the transformation processing will be described below.

In S109, the command generation unit 32 determines whether all of the captured images to be used for generating the panoramic image are acquired, and whether an instruction to interrupt generation of the panoramic image is input.

If it is determined that all of the capture images are acquired or the instruction to interrupt the generation of the panoramic image is input (YES in step S109), the processing proceeds to step S110. On the other hand, if it is determined that not all of the capture images are acquired and that the instruction to interrupt the generation of the panoramic image is not input (NO in step S109), the processing returns to step S106.

When the processing returns to step S106, the command generation unit 32 transmits the camera control command for controlling the video camera 11 to a direction that is a different pan/tilt angle from the former processing in the plurality of pan/tilt angles calculated in step S105. Then, in step S107 to step S109, the above-described processing is similarly performed. By repeating the processing from step S106 to step S109, the client 3 can acquire all of the captured images to use for generating the panoramic image.

In step S110, the command generation unit 32 determines whether the on-screen display in the camera server 1 is turned ineffective (OFF) in step S102. When it is determined that the on-screen display in the camera server 1 is turned ineffective (YES in step S110), then in step S111, the command generation unit 32 transmits the control command for turning the on-screen display in the camera server 1 effective (ON).

In step S112, the command generation unit 32 determines whether the privacy mask processing in the camera server 1 is turned ineffective (OFF) in step S104. If it is determined that the privacy mask processing in the camera server 1 is turned ineffective (YES in step S112), then in step S113, the command generation unit 32 transmits the control command for turning the privacy mask processing in the camera server 1 effective (ON).

In step S114, the image superimposition unit 39 determines whether the generation of the panoramic image is interrupted in step S109. If it is determined that the generation of the panoramic image is not interrupted (NO in step S114), the processing proceeds to step S115. In step S115, the image superimposition unit 39 superimposes the privacy mask image on the panoramic image generated from the plurality of captured images acquired in steps S106 to S109.

In other words, in step S115 (an input procedure), the image superimposition unit 39 inputs parameters regarding the privacy mask position and parameters regarding a drawing method, which are stored in the storage unit 18.

The parameters concerning the privacy mask includes information about a superimposition parameter indicating a superimposition position of the privacy mask, pan/tilt/zoom values at the time of setting the superimposition parameter, and the current pan/tilt/zoom values. The parameters concerning the drawing method includes information about a color or a pattern of the privacy mask image.

In step S115 (a determination procedure), the image superimposition unit 39 superimposes the superimposition position of the privacy mask image on the panoramic image on the superimposition position which is determined based on the parameters concerning the superimposition position of the privacy mask image specified on the captured image and a calculation formula of projective transformation described below.

In other words, the image superimposition unit 39 determines the superimposition position of the privacy mask image on the panoramic image based on the superimposition parameters so that the privacy mask image is superimposed on the superimposition position on the panoramic image, in which the superimposition position on the captured image is converted.

As described above, the communication control unit 14 in the camera server 1 according to the present exemplary embodiment turns ineffective (off) the on-screen display and the function of the privacy mask processing by the image superimposition unit 19 in the camera server 1 in steps S102 and S104 (the control procedure). Then, the communication control unit 14 transmits to the client 3 the plurality of the captured images, which are captured by the video camera 11 and in a state that the on-screen image and the privacy mask are not superimposed.

Then, the client 3 connects the plurality of the captured images to generate a panoramic image. Then, the image superimposition unit 39 in the client 3 performs superimposition processing. More specifically, in steps S102 and S104, the communication control unit 14 in the camera server 1 controls a predetermined image (the privacy mask image) to be superimposed on the panoramic image generated from the plurality of the captured images acquired by a plurality of times of imaging.

Then, in step S115, the communication control unit 31 in the client 3 transmits to the camera server 1 the panoramic image in which various images are superimposed by the image superimposition unit 39. The camera server 1 stores the received panoramic image in the storage unit 18. The communication control unit 14 in the camera server 1 transmits the panoramic image stored in the storage unit 18 to the client 2 in response to a request from the client 2 (an output procedure).

In the present exemplary embodiment, the privacy mask image is superimposed in step S115. However, the superimposition processing can be performed in parallel with the generation of the panoramic image. For example, the panoramic image generation unit 38 in the client 3 synthesizes a first captured image acquired by a first imaging and a second captured image acquired by a second imaging in the plurality of times of the imaging for generating the panoramic image, so that a part of the panoramic image is generated.

Then, when the panoramic image generation unit 38 generates a part of the panoramic image, the image superimposition unit 39 in the client 3 respectively superimposes an image, which is superimposed overlapping the first captured image and the second captured image, on the first captured image and the second captured image. Accordingly, generation of the panoramic image can be completed quicker than a case in which the superimposition processing is performed after completing the panoramic image generation.

Further, in step S115, the image superimposition unit 39 can superimpose the on-screen image on the panoramic image. More specifically, the image superimposition unit 39 can superimpose the on-screen image based on the superimposition parameters concerning an on-screen display position (a position and a size on a captured image) and parameters concerning a display content (a character string and a font size) which are stored in the storage unit 18. Further, for example, the on-screen image can be superimposed in the client 2 which displays the panoramic image.

Figure 3:
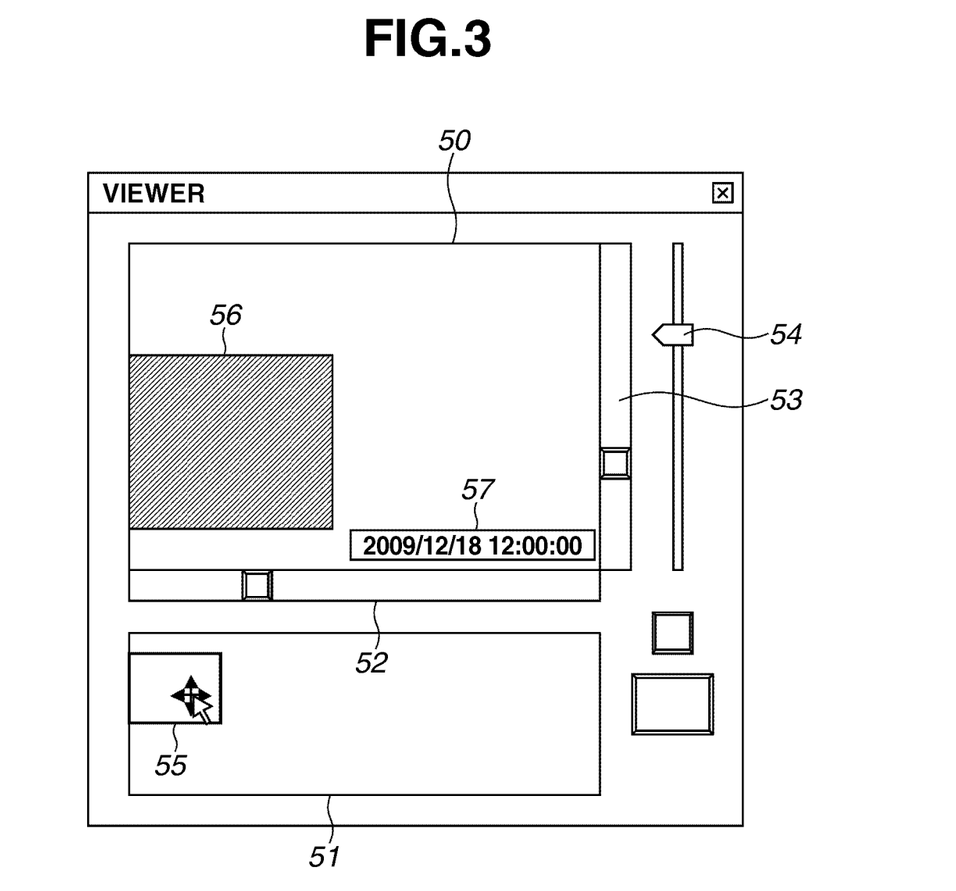
FIG. 3 illustrates an example of image display in a client.

FIG. 3 is an example of a screen display of the client 2 displaying a captured image on which an on-screen image and a privacy mask image are superimposed in the camera server 1.

The display screen in the client 2 includes a live image display unit 50 and a panoramic image display unit 51. The live image display unit 50 displays a live image captured by the video camera 11. The panoramic image display unit 51 displays a panoramic image acquired from the storage unit 18 in the camera server 1.

The display screen in the client 2 includes a pan scroll bar 52, a tilt scroll bar 53, and a zoom slider 54. The pan scroll bar 52 and the tilt scroll bar 53 are used for instructing pan/tilt control of the movable camera platform 12 by dragging a knob. The zoom slider 54 is used for instructing zoom control of the video camera 11 by dragging a knob.

Further, the panoramic image display unit 51 displays a panoramic preview frame 55 for instructing pan/tilt/zoom control. A user can control an image capturing direction of the video camera 11 by moving the panoramic preview frame 55 with, for example, mouse-dragging. Further, the user can control zoom magnification of the video camera 11 by changing a size of the panoramic preview frame 55 with, for example, mouse-dragging. In the live image display unit 50, a live image after controlling by the operation to the panoramic preview frame 55 is displayed.

When the on-screen display and the privacy mask are effective in the camera server 1, a captured image on which an on-screen display image 57 and a privacy mask image 56 are superimposed by the image superimposition unit 19 is displayed in the live image display unit 50. The on-screen image 57 on the captured image is superimposed by the image superimposition unit 19 based on the parameters concerning the on-screen display position (the position and the size on the captured image) and the parameters concerning the display content (the character string and the font size) which are stored in the storage unit 18.

The privacy mask image 56 on the captured image is an image superimposed based on the parameters concerning the superimposition position of the privacy mask and the parameters concerning the drawing method which are stored in the storage unit 18. The parameters concerning the superimposition position of the privacy mask includes, for example, the superimposition parameter concerning the superimposition position of the privacy mask image and the information about the pan/tilt/zoom values at the time of setting of the superimposition parameter, and the current pan/tilt/zoom values. Further, the parameters concerning the drawing method includes the information concerning the color or the pattern of the privacy mask image.

In the privacy mask image 56 in FIG. 3, a part of the left side is missed. An entirety of the privacy mask image can be seen when panning to the left side. An issue that a part of the privacy mask is missed may occur when an image for generating a panoramic image is captured and there is a case that one privacy mask overlaps on adjacent captured images depending on a pan/tilt angle calculated in step S103. In such a case, when the panoramic image is generated by, for example, projective transformation from the plurality of the captured images in which the privacy mask image is superimposed, the privacy mask image may be shifted at a connection part of the panoramic image.

Figure 4:
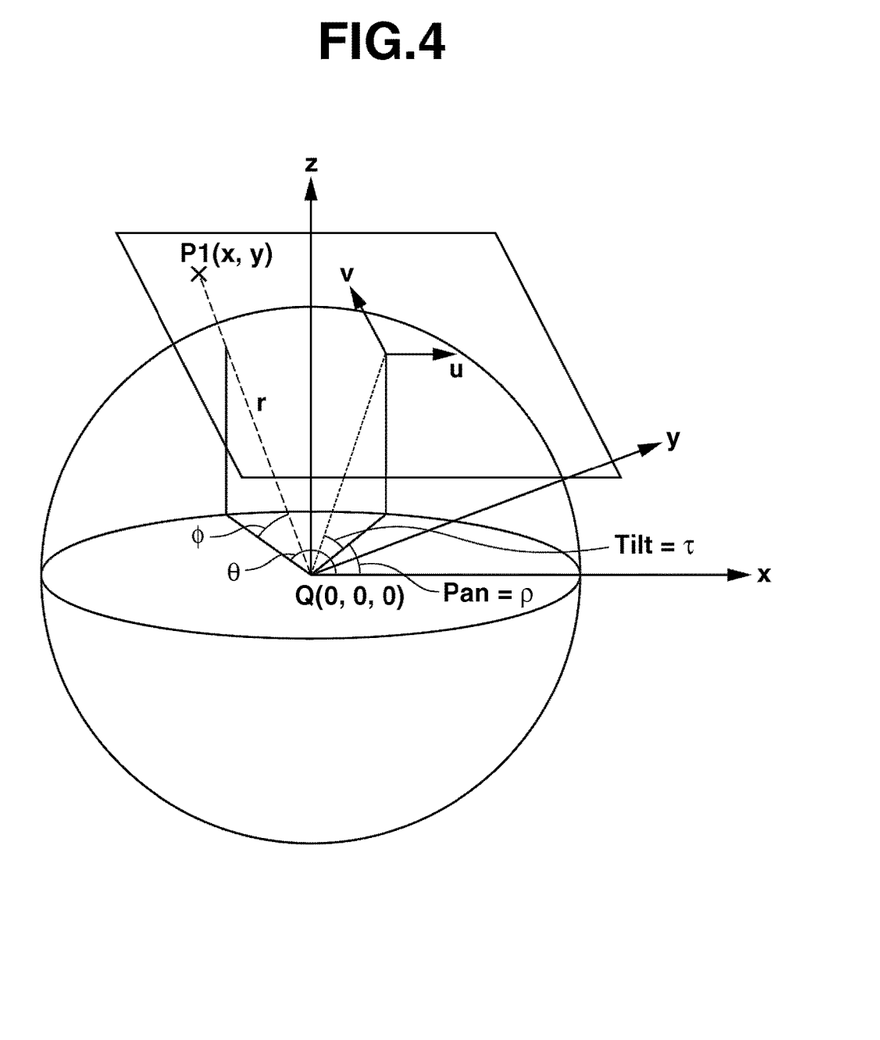
FIG. 4 illustrates a conceptual view of a captured image plane and a panoramic image plane.

The projective transformation used for generating a panoramic image from a plurality of captured images will be described with reference to FIG. 4. FIG. 4 is a conceptual view of a captured image plane and a panoramic image plane.

The projective transformation for generating a panoramic image can be described using a gnomonic projection in a map projection method. More specifically, a view point (which is noted as Q) in the gnomonic projection is placed at a pan/tilt center Q (0, 0, 0).

Coordinates P1 (x, y) on an image plane is acquired at a certain pan/tilt angle $(\rho, \tau)$. When the image is placed so as to contact on a sphere having the viewpoint Q as the center and a radius R, a coordinate of a point, at which a straight line connecting P1 (x, y) and the viewpoint Q crosses the sphere, is displayed with a polar coordinate.

When a result of the polar coordinate display is (R sin $\theta$ cos $\varphi$, R cos $\theta$ cos $\varphi$, R sin $\varphi$), in the gnomonic projection, the following formula is generally satisfied.

$x = m \cdot R \cos \varphi \sin(\theta-\rho)/\{\sin \varphi \sin \tau + \cos \varphi \cos \tau \cos(\theta-\rho)\}$ (Formula 1.1)

$y = m \cdot R(\sin \varphi \cos \tau - \cos \varphi \sin \tau \cos(\theta-\rho))/\{\sin \varphi \sin \tau + \cos \varphi \cos \tau \cos(\theta-\rho)\}$ (Formula 1.2)

When the pan/tilt angle is $(\rho, \tau)$, a coordinate on the image plane at which the image plane crosses the sphere is an original point (0, 0).

An entire imaging area acquired by panning/tilting is indicated by an angle, that are a pan direction is $\theta$ min to $\theta$ max and a tilt direction is $\varphi$ min to $\varphi$ max. In these angles, an angle of view of the video camera 11 is added to a pan/tilt movable area of the movable camera platform 12.

More specifically, when pan/tilt limits are respectively Pmin, Pmax, Tmin, and Tmax, and the video camera 11 has the angles of view Ah and Av in the horizontal direction and the vertical direction respectively, the following formulas are satisfied.

$\theta \min = P \min - Ah/2$ $\theta \max = P \max + Ah/2$ $\varphi \min = P \min - Av/2$ $\varphi \max = P \max + Av/2$ When pixel numbers of a generated panoramic image are H pixels in the horizontal direction and V pixels in the vertical direction, the angles of view corresponding to one pixel in the pan direction and the tile direction are respectively described in the following formulas.

$\Delta\theta = (\theta \max - \theta \min)/H$ (Formula 2.1)

$\Delta\varphi = (\varphi \max - \varphi \min)/V$ (Formula 2.2)

More specifically, when a pixel (i, j) is expressed by the pan/tilt angle $(\theta, \varphi)$, the following formula is satisfied.

$(\theta, \varphi) = (\theta \min + \Delta\theta \times i, \varphi \min + \Delta\varphi \times j)$ wherein
i=0, 1, 2, . . . , H−1, and
j=0, 1, 2, . . . , V−1.

Accordingly, from the value $(\theta, \varphi)$ and the pan/tilt angle $(\rho, \tau) = (Pa, Tb)$ at the time of acquiring a certain image img(Pa, Tb), which coordinate on the panoramic image a coordinate (x, y) on the image img(Pa, Tb) corresponds to can be determined using the Formulae (1.1), (1.2), (2.1), and (2.2), wherein a=1, 2, . . . , n, and b=1, 2, . . . , m. More specifically, when a coordinate on the panoramic image is Xp and Yp, and the transformation formula is F, a coordinate of an original captured image is mapped in a coordinate on the panoramic image by the following Formula 3.

$(Xp, Yp) = F(X, y, Pa, Tb)$ (Formula 3)

Accordingly, a pixel value of the coordinate (Xp, Yb) on the panoramic image can be replaced by a pixel value of the original captured image img(Pa, Tb). When such calculation is performed on the pixels (i, j) on the entire panoramic image, a panoramic image having a coordinate system linear to the pan/tilt angle can be acquired. The transformation formula F is the calculation formula of the projective transformation executed by the panoramic image generation unit 38.

As described above, in the present exemplary embodiment, since superimposition processing of the on-screen image in the camera server 1 is ineffective during capturing images for generating a panoramic image, unnecessary on-screen image display illustrated in FIG. 5 can be prevented.

Further, during capturing the images for generating the panoramic image, superimposition processing of the privacy mask image in the camera server 1 is ineffective. The superimposition position of the privacy mask image on the panoramic image in which the superimposition position of the privacy mask image is converted by the projective transformation can be determined based on the superimposition parameters for determining the superimposition position of the privacy mask image on the captured image and the calculation formulae of the projective transformation. With this configuration, a panoramic image having a smooth edge part of the privacy mask image can be generated.

More specifically, the image superimposition unit 39 calculates the transformation formula F from the pan/tilt/zoom values at the time of setting the privacy mask which are stored in the storage unit 18. Then, the image superimposition unit 39 substitutes coordinates of each pixel configuring the privacy mask on the captured image at the time of setting the privacy mask for the formula 3, and determines an area of the privacy mask image. With this processing, the privacy mask image having the smooth edge part can be superimposed on the panoramic image.

When the mask area is managed by the pan angle, the tilt angle, a width, and a height of the camera, and a panoramic image is generated from a plurality of captured images on which the mask image is superimposed, there is a case in which an original mask area and an area on which the mask image is actually superimposed are shifted. This phenomenon is particularly remarkable in an area having a large tilt angle (an area of the upper side in FIG. 5). This is because as the tilt angle is large, a moving direction of an image capturing direction of the camera according to pan control becomes different from a just horizontal direction.

In the present exemplary embodiment, the function of the image superimposition unit 19 in the camera server 1 is ineffective at the time of generating the panoramic image, and the image superimposition unit 39 in the client 3 connected via the network 4 superimposes the privacy mask image on the panoramic image. However, the present invention is not limited to this example.

For example, in the camera server 1, after the function of the image superimposition unit 19 is turned ineffective, a panoramic image is generated from a plurality of captured images acquired by a plurality of times of imaging. Then, the image superimposition unit 19 in the camera server 1 can superimpose a privacy mask image. In this case, the communication control unit 14 in the camera server 1 maintains the function of the image superimposition unit 19 effective (ON), when the captured image is output and it is determined that the privacy mask processing in the image superimposition unit 19 is ON in step S103.

On the other hand, when the panoramic image is output and it is determined that the privacy mask processing in the image superimposition unit 19 is ON in step S103, in step S104, the communication control unit 14 temporarily turns the function of the image superimposition unit 19 ineffective, so that the privacy mask is superimposed on the panoramic image. In other words, the communication control unit 14 in the camera server 1 performs control to superimpose the privacy mask image after generation of the panoramic image, when the panoramic image is output.

With this processing, the camera server 1 can generate a high quality panoramic image inside thereof. Further, the camera server 1 can receive, from the client 3, a panoramic image generated in the client 3, and superimpose the privacy image on the panoramic image.

Further, the above-described exemplary embodiment focuses on the processing for superimposing the privacy mask image on the generated panoramic image. However, the processing is not limited to this case. For example, when mask processing (mosaic processing or processing for lowering resolution of a specific area) is performed instead of superimposition of the privacy mask image, the present invention is applicable.

In this case, in step S104, the communication control unit 14 in the camera server 1 performs control to turn the mask processing in the image superimposition unit 19 ineffective so that the mask processing is performed on a panoramic image acquired from a plurality of captured images; and transmits the captured image without the mask processing to the client 3. Then, in step S115, the client 3 generates the panoramic image while determining a mask position on the panoramic image based on mask parameters indicating the mask position specified on the captured image and the calculation formula of the project conversion to perform the mask processing.

The mask parameters, like the superimposition parameters of the privacy mask image, can be input using the operation input units 23 and 34 in the clients 2 and 3, for example. The superimposition unit 39 in the client 3 determines the mask position on the panoramic image based on the mask parameters, pan/tilt/zoom values at the time of setting the mask parameters, the current pan/tilt/zoom values, and the calculation formula of the projective transformation, and performs the mask processing.

The mask parameters are not limited to the input from the operation control units 23 and 34. For example, area information indicating an area of a face image detected by image processing can be used as a mask parameter. With this configuration, for example, irregularity of an edge part of mosaic processing can be reduced. In step S115, the superimposition unit 19 in the camera server 1 can perform the mask processing to the panoramic image.

Further, the above-described exemplary embodiment focuses on the processing for superimposing the privacy mask image on the generated panoramic image. However, the processing is not limited to this case. For example, before actually generating a panoramic image, the superimposition position of the privacy mask image on the panoramic image is calculated, and the privacy mask image can be superimposed based on the calculated result. Further, the method for acquiring the superimposition position of the privacy mask is not limited to calculation but can perform by, for example, referring a table.

Further, in the above-described exemplary embodiment, the processing of each unit in the camera server 1, the client 2, and the client 3 illustrated in FIG. 1 is executed by dedicated hardware of each apparatus. However, at least a part of the processing can be executed by a central processing unit (CPU). For example, at least a part of each unit in the camera server 1 illustrated in FIG. 1 can be replaced by a CPU in the camera server 1 and a memory storing a program executed by the CPU, and the CPU can execute the processing.

Similarly, at least a part of each unit in the clients 2 and 3 can be replaced by a CPU in the clients 2 and 3 and a memory storing a program executed by the CPU, and the CPU can execute the processing. Accordingly, at least a part of the processing in the flowchart illustrated in FIG. 2 can be executed by the CPU.

Aspects of the present invention can also be realized by a computer of a system or apparatus (or devices such as a CPU or a micro processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-198776 filed Sep. 6, 2010, which is hereby incorporated by reference herein in its entirety.

What is claimed is:

1. A processing apparatus capable of generating a panoramic captured image from a plurality of captured images having different angles of view, the processing apparatus comprising:
   a receiving unit configured to receive a single captured image, a privacy mask image being superimposed at a first position of the single captured image, and the first position being derived based on a superimposition position of the privacy mask image on the single captured image and information about at least one of pan, tilt, and zoom values of an imaging unit at a time of setting the privacy mask image;
   a sending unit configured to send the imaging unit a command to turn off a superimposition processing to superimpose the privacy mask image at the first position of the single captured image for a client in response to an instruction to generate the panoramic captured image;
   a generation unit configured to generate the panoramic captured image from the plurality of the captured images having different angles of view without superimposing the privacy mask image by turning off the superimposition processing, the panoramic captured image is generated by transformation processing of coordinate values of the plurality of the captured images without superimposing the privacy mask image;
   a determination unit configured to determine a second position to superimpose a new privacy mask image on the generated panoramic captured image by transforming the first position to the second position using projective transformation; and
   a superimposition unit configured to superimpose the new privacy mask image at the second position of the generated panoramic captured image, the second position of the panoramic captured image being corresponding to the first position of the single captured image so that a partial image of the panoramic captured image corresponding to a masked partial image of the single captured image can be masked by the new privacy mask image,
   wherein the generation unit creates the panoramic captured image when superimposition processing does not occur, and the superimposition unit superimposes the new privacy mask image at the second position after creation of the panoramic captured image.

2. The processing apparatus according to claim 1, wherein the privacy mask image is an image indicating at least any information about an imaging time and an imaging place of the captured image.

3. A method for generating a panoramic captured image performed by a processing apparatus capable of generating a panoramic captured image from a plurality of captured images having different angles of view, acquired at a plurality of imaging times, the method comprising:
   receiving a single captured image, a privacy mask image being superimposed at a first position of the single captured image, and the first position being derived based on a superimposition position of the privacy mask image on the single captured image and information about at least one of pan, tilt, and zoom values of an imaging unit at a time of setting the privacy mask image;
   sending the imaging unit a command to turn off a superimposition processing to superimpose the privacy mask image at the first position of the single captured image for a client in response to an instruction to generate the panoramic captured image;
   generating the panoramic captured image from the plurality of the captured images having different angles of view without superimposing the privacy mask image by turning off the superimposition processing, the panoramic captured image is generated by transformation processing of coordinate values of the plurality of the captured images without superimposing the privacy mask image;
   determining a second position to superimpose a new privacy mask image on the generated panoramic captured image according to position information by transforming the first position to the second position using projective transformation; and
   superimposing the new privacy mask image at the second position of the generated panoramic captured image, the second position of the panoramic captured image being corresponding to the first position of the single captured image so that a partial image of the panoramic captured image corresponding to a masked partial image of the single captured image can be masked by the new privacy mask image,
   wherein the generating creates the panoramic captured image when superimposition processing does not occur, and the superimposing superimposes the new privacy mask image at the second position after creation of the panoramic captured image.

4. The method according to claim 3, wherein the privacy mask image is an image indicating at least any information about an imaging time and imaging place of the captured image.

5. A non-transitory computer-readable recording medium storing a program executable by a computer capable of generating a panoramic captured image from a plurality of captured images having different angles of view, the program comprising:

code for receiving a single captured image, a privacy mask image being superimposed at a first position of the single captured image, and the first position being derived based on a superimposition position of the privacy mask image on the single captured image and information about at least one of pan, tilt, and zoom values of an imaging unit at a time of setting the privacy mask image;

code for sending the imaging unit a command to turn off a superimposition processing to superimpose the privacy mask image at the first position of the single captured image for a client in response to an instruction to generate the panoramic captured image;

code for generating the panoramic captured image from the plurality of the captured images having different angles of view without superimposing the privacy mask image by turning off the superimposition processing, the panoramic captured image is generated by transformation processing of coordinate values of the plurality of the captured images without superimposing the privacy mask image;

code for determining a second position to superimpose a new privacy mask image on the generated panoramic captured image by transforming the first position to the second position using projective transformation; and code for superimposing the new privacy mask image at the second position of the generated panoramic captured image, the second position of the panoramic captured image being corresponding to the first position of the single captured image so that a partial image of the panoramic captured image corresponding to a masked partial image of the single captured image can be masked by the new privacy mask image, wherein the code for generating creates the panoramic captured image when superimposition processing does not occur, and the code for superimposing superimposes the new privacy mask image at the second position after creation of the panoramic captured image.

6. The non-transitory computer-readable recording medium according to claim 5, wherein the privacy mask image is an image indicating at least any information about an imaging time and imaging place of the captured image.

7. A processing apparatus capable of generating a panoramic captured image from a plurality of captured images having different angles of view, the processing apparatus comprising:

a receiving unit configured to receive a single captured image, a predetermined image related to the single captured image being superimposed at a first position of the single captured image;

a transmission unit configured to transmit to an imaging unit a command for turning off a function to superimpose on the single captured image, in response to an instruction to generate the panoramic captured image so that the receiving unit receives a plurality of the captured images having different angles of view, the plurality of the received captured images being without the predetermined image; and a generation unit configured to generate the panoramic captured image from the plurality of the received captured images without the predetermined image and to superimpose a new predetermined image on the panoramic captured image corresponding to the predetermined image after the panoramic captured image is created.

8. A processing apparatus according to claim 7, further comprising a superimposing unit configured to superimpose the new predetermined image on the generated panoramic captured image.

9. A processing apparatus according to claim 7, wherein the predetermined image is an image indicating at least any information about one of an imaging time and an imaging place of the captured image.

10. A method for generating a panoramic captured image performed by a processing apparatus capable of generating a panoramic captured image from a plurality of captured images having different angles of view, the method comprising:

receiving a single captured image, a predetermined image related to the single captured image being superimposed at a first position of the single captured image;

transmitting to an imaging unit a command for turning off a function to superimpose the predetermined image on the single captured image, in response to an instruction to generate the panoramic captured image;

receiving a plurality of the captured images having different angles of view, the plurality of the received captured images being without the predetermined image; and generating the panoramic captured image from the plurality of the received captured images without the predetermined image and to superimpose a new predetermined image on the panoramic captured image corresponding to the predetermined image after the panoramic captured image is created.

11. A non-transitory computer-readable recording medium storing a program executable by a computer capable of generating a panoramic captured image from a plurality of images having different angles of view, the program comprising:

code for receiving a single captured image, a predetermined image related to the single captured image being superimposed at a first position of the single captured image;

code for transmitting to an imaging unit a command for turning off a function to superimpose the predetermined image on the single captured image, in response to an instruction to generate the panoramic captured image;

code for receiving a plurality of the captured images having different angles of view, the plurality of the received captured images without the predetermined image; and code for generating the panoramic captured image from the plurality of the captured images without the predetermined image and to superimpose a new predetermined image on the panoramic captured image corresponding to the predetermined image after the panoramic captured image is created.

* * * * *